No. 836,323. PATENTED NOV. 20, 1906.
J. W. KEEGAN.
PROCESS OF SEWAGE DISPOSAL.
APPLICATION FILED AUG. 5, 1905.
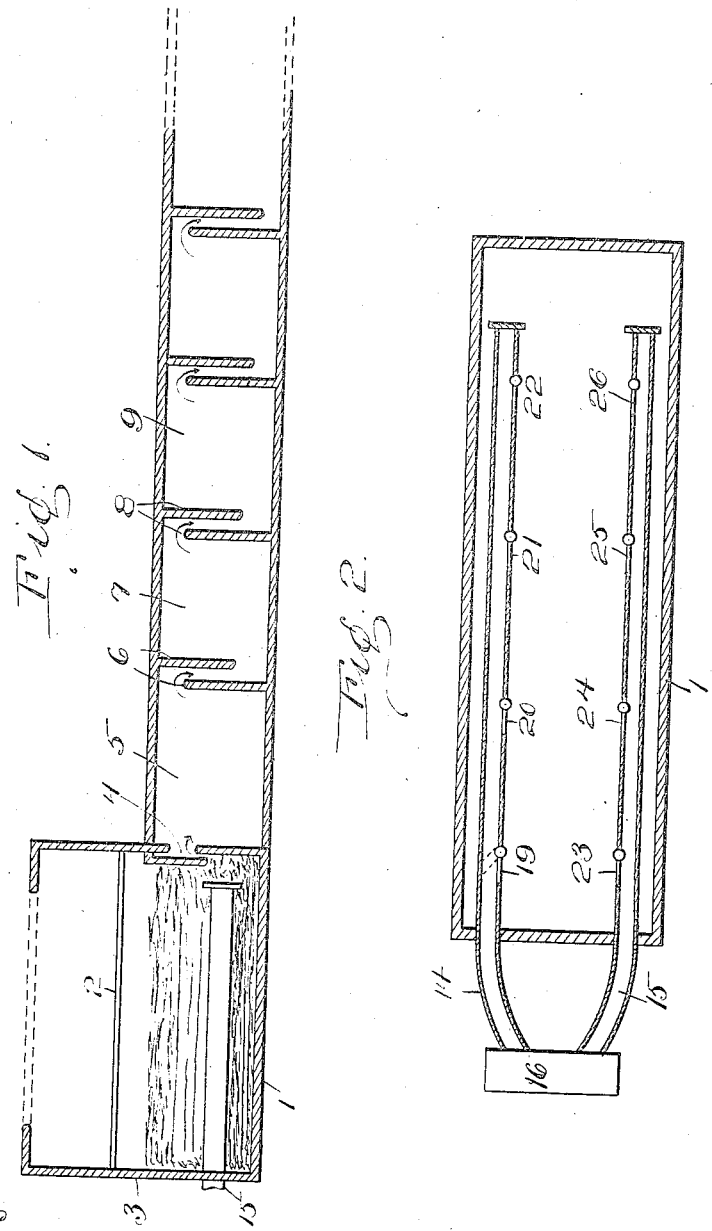
Witnesses
A. J. Trigg
E. L. Corbett
Inventor
John William Keegan
By J. P. Medina
Attorney

UNITED STATES PATENT OFFICE.

JOHN WILLIAM KEEGAN, OF SANTA ROSA, CALIFORNIA.

PROCESS OF SEWAGE DISPOSAL.

No. 836,323.   Specification of Letters Patent.   Patented Nov. 20, 1906.

Application filed August 5, 1905. Serial No. 272,926.

*To all whom it may concern:*

Be it known that I, JOHN WILLIAM KEEGAN, a citizen of the United States, and a resident of the city of Santa Rosa, county of Sonoma, State of California, have invented a new and useful Improvement in Processes of Sewage Disposal, of which the following is a specification.

My invention relates to processes of sewage disposal by means of anærobic bacteria. Sewage sludge has been hitherto treated in septic-tanks under conditions which produce anærobic action; but I have discovered that in the effluent from such tanks or, as I prefer to call them, "anærobic" bacterial beds the decreased quantity of dead organic matter is accompanied by a like decrease in the quantity of anærobic bacteria; and my invention has for its object to produce a completely purified effluent by the application of this physical fact to the treatment of sewage.

I accomplish my object by my improved process, which, briefly described, consists in subjecting the effluent from an anærobic bacterial bed to similar anærobic treatment in a second bed and in similarly treating the effluent from the second bed in a third bed, and so on continuously until the dead organic matter and the anærobic bacteria have all disappeared. To produce this gradual disappearance of dead organic matter and along with it the disappearance of the contained anærobic bacteria being the principal object of my invention, all other bacteria having been destroyed by anærobic action, I have also a secondary object, which relates to the treatment of the sewage in the first of the series of beds used in my process. This secondary object is to further the purifying process by improving the mode of introducing the sewage into said bed.

I will now proceed to explain the process of sewage disposal, which consists in the application of the physical fact relating to the decrease of dead organic matter and the accompanying decrease in the quantity of anærobic bacteria and will follow with a description of my improved mode of introducing the sewage into the initial bacterial bed.

Figure 1 is a diagrammatic view of an instrument for reducing my process to practice. Fig. 2 is a diagrammatic view of the initial bed of said apparatus, showing means of shifting the place of defective anærobic activity.

I provide a bacterial bed 1 of suitable capacity, into which the sewage is poured and allowed to remain bedded under conditions which cultivate anærobic bacteria. The primary condition is the absence of free oxygen in the mass of sewage. This is primarily provided for in the first instance by covering the top with a subpermanent cover 2, which is allowed to remain until a scum 3 of suitable thickness has been produced, whereupon said cover is removed, the scum thereafter providing for the separation of the sewage mass from the oxygen-bearing air. The scum is thereafter disintegrated continually by oxidation from the top while being added to from the bottom.

The sewage is allowed to remain in bed 1 until it rises to the level of the efflux aperture 4. The fluid parts then begin to flow into the second covered bacterial bed 5, where they are restrained by the dam 6, carrying into said chamber in suspension and solution a diminished quantity per unit of bulk of dead organic matter and a correspondingly diminished quantity of anærobic bacteria. The retardation to the flow of the effluent effected by dam 6 causes a deposition of part of the dead organic matter on the surfaces of bacterial bed 5, while the fluid parts flow into the third bed 7, carrying with them a still further diminished quantity of dead organic matter and a correspondingly-diminished quantity of anærobic bacteria. The action of the anærobic bacteria continues in the second bacterial bed as it began in the first, the influx consisting of the primarily-treated efflux from the initial bed and the efflux consisting of the secondarily-treated fluid, as aforesaid. The flow through the third bed 7 is retarded by dam 8, a like deposition of dead organic matter and of the inflowing anærobic bacteria being effected thereby, the influx into bed 7 consisting of the secondarily-treated fluid from bed 5. The series of beds and retarding-dams is continued until the succession of separate bacterial activities has completely purified the effluent of organic matter and anærobic bacteria. The effluent then consists of water holding in solution various gases, and these are eliminated by spraying in the open air; but the spraying forms no part of my process, which is confined to the elimination of dead organic matter by anærobic bacterial action throughout.

Referring now to my mode of introducing the sewage into the initial bed, I have discovered that there is a tendency to retard the anærobic action near the region of introduction of the sewage into the bed, caused by the presence of free oxygen, and that this tendency produces a clogging of the entrance parts in said bed. This clogging interrupts the free flow of the sewage and retards the activity in the bed as a whole. The object of my improved mode of introduction is to provide means of overcoming the clogging tendency and to allow free bacterial action. Briefly, I accomplish my object by shifting the point of introduction of the sewage sludge into the initial bed. Referring to Fig. 2, which is a horizontal section of my initial bacterial bed illustrating my mode of introduction of the sewage sludge into the said bed, 14 15 are conduits from a grit-chamber 16, which chamber, however, forms no part of my invention, through which the sewage sludge is admitted into pipes 17 18, extending along the sides the entire length of said bed. 19 20 21 22 23 24 25 26 are gates in said conduits. These gates control ports from said conduits opening into the bacterial bed. In applying my process all the gates excepting one are closed, and the sewage sludge enters at the open gate. After some time has elapsed the region about this point of entry becomes defective in anærobic activity, the time varying through various causes from weeks to months, but the defective state being always manifested by a heaping up of the scum directly over the defective region. Supposing gate 26 to be the one controlling this region, when the scum over said gate is discovered to be in the said abnormal condition gate 26 is closed and entrance is effected by opening some other gate, as 20, for instance, far away from the defective region. Normal anærobic action thereupon begins in the region about gate 26. When the scum over gate 20 shows the existence of a defective action, like that previously appearing at gate 26, gate 20 is closed and another gate opened. This process is continued, the gates being respectively opened and closed as often as the scum above the open gate indicates the expediency of a change.

Actual tests of my process show a complete elimination of dead organic matter and anærobic bacteria between the point of introduction in the initial bacterial bed and the point of efflux from the final bed. The sewage matter prior to anærobic treatment is passed through a grit-chamber 16, Fig. 2, adapted to retain the bulky mineral substances that may be contained therein. The remaining mineral constituents are allowed to deposit themselves in the bacterial beds, their amount being so small as not to materially affect said beds until after many years of deposition.

Having described my invention, what I claim as new, and desire to secure by Letters Patent of the United States, is—

1. The improvement in processes of sewage disposal, which consists in maintaining substantial uniformity of anærobic activity in an anærobic bed by shifting the position of the region of defective anærobic activity therein periodically.

2. The improvement in processes of sewage disposal which consists in subjecting sewage matter to an initial treatment in a bacterial bed wherein substantial uniformity of anærobic activity is maintained by periodically shifting the position of the region of defective anærobic activity, and in subjecting the effluent from said bed to a succession of anærobic treatments until the contained bacteria have been substantially eliminated.

In testimony whereof I have hereunto written my name in the presence of two witnesses.

JOHN WILLIAM KEEGAN.

Witnesses:
FINLAY COOK,
W. H. MEAD.